US009508310B2

(12) United States Patent
Barnes

(10) Patent No.: US 9,508,310 B2
(45) **Date of Patent: *Nov. 29, 2016**

(54) MANUAL SWITCH SYSTEM FOR OUTPUTTING MULTIMEDIA CONTENT TO A DIGITAL SIGN

(75) Inventor: Michael S. Barnes, Kennesaw, GA (US)

(73) Assignee: Michael S. Barnes, Marietta, GA (US)

( * ) Notice: Subject to any disclaimer, the term of this patent is extended or adjusted under 35 U.S.C. 154(b) by 485 days.

This patent is subject to a terminal disclaimer.

(21) Appl. No.: 13/569,498

(22) Filed: Aug. 8, 2012

(65) Prior Publication Data

US 2014/0043302 A1 Feb. 13, 2014

(51) Int. Cl.
*G06F 15/16* (2006.01)
*G09G 5/00* (2006.01)

(52) U.S. Cl.
CPC .......... *G09G 5/003* (2013.01); *G09G 2380/14* (2013.01)

(58) Field of Classification Search
CPC .......................... G09G 5/003; G09G 2380/14
USPC .......................................................... 709/209
See application file for complete search history.

(56) References Cited

U.S. PATENT DOCUMENTS

| | | | | |
|---|---|---|---|---|
| 6,469,690 | B1 * | 10/2002 | Abraham et al. | 345/156 |
| 8,447,890 | B1 * | 5/2013 | LeTourneur et al. | 710/8 |
| 2002/0105553 | A1 * | 8/2002 | Segre | 345/862 |
| 2003/0222801 | A1 * | 12/2003 | Ying et al. | 341/26 |
| 2004/0203373 | A1 * | 10/2004 | Ogino et al. | 455/41.2 |
| 2005/0262216 | A1 * | 11/2005 | Kashiwabara et al. | 709/208 |

* cited by examiner

*Primary Examiner* — Jonathan Boyd
(74) *Attorney, Agent, or Firm* — Michael F. Krieger; Kirton McConkie

(57) ABSTRACT

The present invention extends to a manual switch system for selecting multimedia content from one or various source inputs to be provided to a digital display. The manual switch system of the present invention provides a compact, convenient, and simple to use solution for updating a digital display in many environments. In a particular example, the manual switch can be used within a fast food restaurant to quickly and easily update the menu such as when the restaurant switches from serving breakfast to lunch or dinner.

16 Claims, 6 Drawing Sheets

500

MANUAL SWITCH SYSTEM FOR OUTPUTTING MULTIMEDIA CONTENT TO A DIGITAL SIGN

CROSS-REFERENCE TO RELATED APPLICATIONS

Not Applicable.

BACKGROUND

Signs have been used in various ways to convey information to consumers. Such signs include billboards along roads, signs in front of businesses, and menus at restaurants. With the advances in computer display technology, many of the traditional static signs have been replaced with digital displays capable of displaying a constantly changing output.

Such digital displays have been very beneficial in many environments because they are easily updated. For example, when static signs are used, the sign must be physically modified to update its display. In contrast, digital signs can be updated by outputting a different multimedia signal to the display. With the internet, such updates can be performed from virtually any location in the world.

Although digital signs may be preferred in many environments, current computing systems present various barriers that prevent upgrading to digital signs. For example, in many environments, a standard flat panel display attached to a personal computer may be adequate for displaying a desired sign or other content. However, in other environments, such configurations may be excessive in both cost and complexity.

As an example, many restaurants, such as fast food restaurants, display their menu both inside the store and outside (e.g. in the drive through). Oftentimes, such restaurants update the menu various times each day (e.g. for breakfast and lunch/dinner). Traditionally, these menus have been updated by physically moving (e.g. turning, sliding, etc.) a portion of the menu. Such signs can be difficult/costly to update because generally an entire portion of the sign must be updated. However, a restaurant may not desire to utilize a digital sign because of the initial cost of the equipment, and the difficulty of updating the display.

Specifically, when a typical personal computer or similar type computer is used to generate a multimedia output for display on a digital display device, it may be excessively difficult for many of the employees to update the display (e.g. when the employees are not skilled with computers, or do not have the time to interact with a personal computer to update the display). Also, a personal computer may occupy excessive space within the restaurant. Accordingly, current approaches to providing digital signs have not been adequate in such environments.

BRIEF SUMMARY

The present invention extends to a manual switch system for selecting multimedia content from one or various source inputs to be provided to a digital display. The manual switch system of the present invention provides a compact, convenient, and simple to use solution for updating a digital display in many environments. In a particular example, the manual switch can be used within a fast food restaurant to quickly and easily update the menu such as when the restaurant switches from serving breakfast to lunch or dinner.

In one embodiment, a manual switch system for controlling the output of multimedia content to a digital display device comprises a plurality of source input ports for receiving external media devices that store multimedia content, a switching mechanism for connecting one of the source input ports to an output port. a processor for accessing and rendering the multimedia content on the external media devices for display on a display device connected to the manual switch system via the output port, and a manual switch for controlling the position of the switching mechanism.

In another embodiment, a display system comprises a first and a second manual switch system. Each of the first and second manual switch systems comprises a plurality of source input ports for receiving external media devices that store multimedia content. a switching mechanism for connecting one of the source input ports to an output port, a processor for accessing and rendering the multimedia content on the external media devices for display on a display device connected to the manual switch system via the output port, a manual switch for controlling the position of the switching mechanism, a master/slave switch for configuring the manual switch system as a master or a slave in a group of manual switch systems, a remote output port over which is outputted a control signal for controlling the switching mechanism in another manual switch system when the master/slave switch is in a master position, and a remote source port over which is input a control signal from another manual switch system for controlling the switching mechanism of the manual switch system when the master/slave switch is in a slave position.

This summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages of the invention will be set forth in the description which follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION

The present invention extends to a manual switch system for selecting multimedia content from one or various source inputs to be provided to a digital display. The manual switch system of the present invention provides a compact, convenient, and simple to use solution for updating a digital display in many environments. In a particular example, the manual switch can be used within a fast food restaurant to quickly and easily update the menu such as when the restaurant switches from serving breakfast to lunch or dinner.

In one embodiment, a manual switch system for controlling the output of multimedia content to a digital display device comprises a plurality of source input ports for receiving external media devices that store multimedia content, a switching mechanism for connecting one of the source input ports to an output port. a processor for accessing and rendering the multimedia content on the external media devices for display on a display device connected to the manual switch system via the output port, and a manual switch for controlling the position of the switching mechanism.

In another embodiment, a display system comprises a first and a second manual switch system. Each of the first and second manual switch systems comprises a plurality of source input ports for receiving external media devices that store multimedia content. a switching mechanism for connecting one of the source input ports to an output port, a processor for accessing and rendering the multimedia content on the external media devices for display on a display device connected to the manual switch system via the output port, a manual switch for controlling the position of the switching mechanism, a master/slave switch for configuring the manual switch system as a master or a slave in a group of manual switch systems, a remote output port over which is outputted a control signal for controlling the switching mechanism in another manual switch system when the master/slave switch is in a master position, and a remote source port over which is input a control signal from another manual switch system for controlling the switching mechanism of the manual switch system when the master/slave switch is in a slave position.

Figure 1:
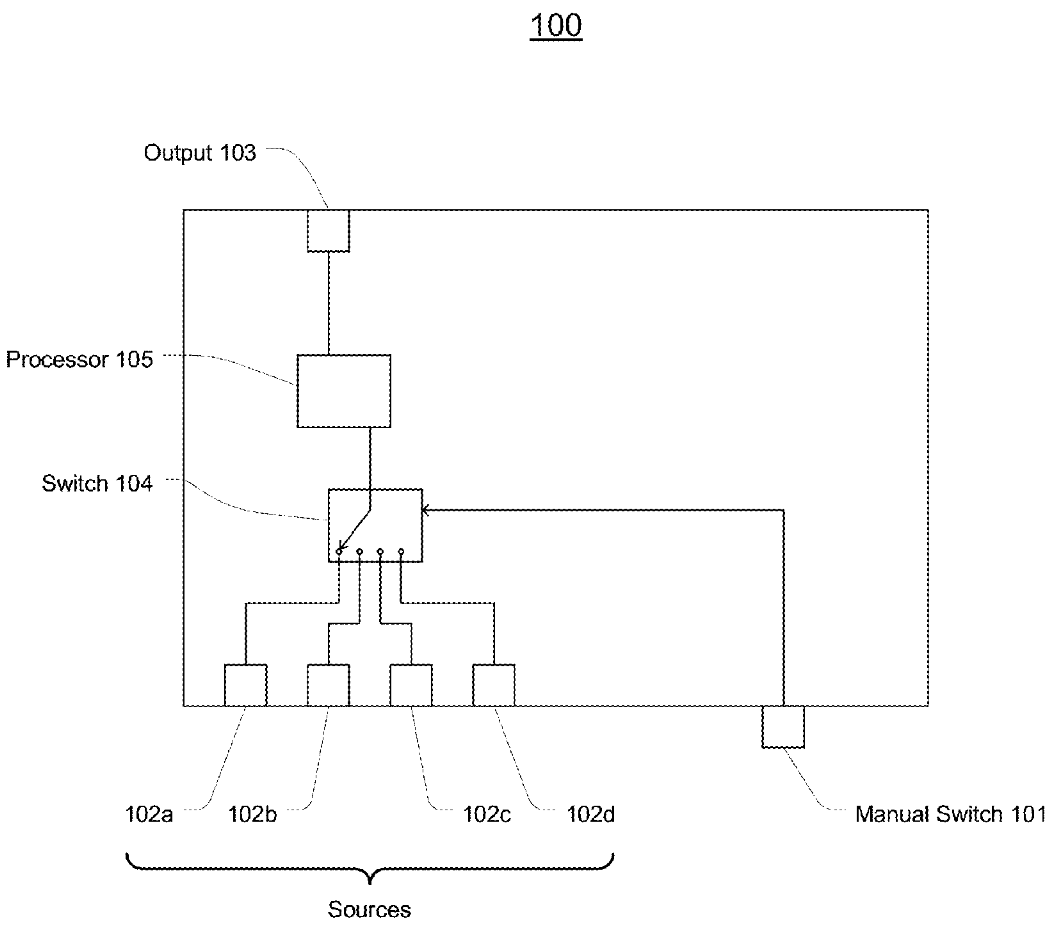
FIG. 1 illustrates a circuit diagram of an exemplary manual switch system.

FIG. 1 illustrates a circuit diagram of an exemplary manual switch system 100 in accordance with one or more embodiments of the present invention. Manual switch system 100 includes four source inputs 102*a*-102*d* connected to output 103 via a switch 104. A processor 105 is positioned between source inputs 102*a*-102*d* and output 103 and contains logic for accessing and rendering multimedia content. Switch 104 is controlled manually via manual switch 101. Although FIG. 1 illustrates switch 104 and processor 105 conceptually as different components, it is known that a single component (e.g. a microprocessor) could perform the switching and processing functionality.

Each of source inputs 102*a*-102*d* comprises an interface for connecting external media to manual switch system 100. For example, source inputs 102*a*-102*d* can comprise any type of computer port such as USB, Ethernet, SCSI, SD socket, etc. for connecting external media to manual switch system 100. Source inputs 102*a*-102*d* allow external media storing multimedia content to be connected to manual switch system 100 to allow the multimedia content to be accessed and output via output 103 for display on an attached display device. Examples of external media include flash drives, SD cards, hard drives, or any other type of external media used for storing multimedia content. Although four source inputs are shown, any other reasonable number of source inputs could be used in a manual switch system of the present invention. Any type of multimedia content can be accessed and rendered by processor 105 including sound, image, and video content.

Manual switch 101 is connected to switch 104 to enable the selection of a particular external media device from which multimedia content is selected for output. Specifically, with respect to manual switch system 100, because the system includes four input sources, manual switch 101 can have four positions, each position corresponding to a particular input source. In this manner, switching from one input source to another is accomplished by moving manual switch 101 to the appropriate position. Alternatively, manual switch 101 can be a pushbutton where each press of the pushbutton causes switch 104 to advance to the next position.

This simple way to switch sources facilitates manual switch system 100's use in various environments such as in a fast food restaurant for controlling the display of a menu. For example, multimedia content comprising a breakfast menu can be stored on a first external media device (e.g. a USB flash drive) and inserted into source input 102*a*, while multimedia content comprising a lunch/dinner menu can be stored on a second external media device (e.g. another USB flash drive) and inserted into source input 102*b*. Then, to switch from the breakfast menu to the lunch/dinner menu, an employee only has to move manual switch 101 from a first to a second position.

Processor 105 is configured to access multimedia content that is stored on the external media attached to the source input to which switch 104 is connected. Accordingly, when switch 104 is in the first position, processor accesses multimedia content stored on the first external media device and renders the multimedia content to output 103. Likewise, when switch 104 is in the second position, processor accesses multimedia content stored on the second external media device and renders the multimedia content to output 103. Multimedia content stored on a third or fourth external media device can be accessed in a similar manner.

As can be seen, manual switch system 100 is a simple solution that can be used in place of a typical personal computer in many environments thereby providing an inexpensive, easier, and quicker to use solution for implementing a digital sign. Manual switch system 100 requires no understanding of computers, and can be switched immediately using a simple manual switch.

In addition to facilitating the switching of multimedia content, manual switch system 100 also facilitates the updating of multimedia content. As stated above, each of source inputs 102*a*-102*d* can be a common computer port that can receive an external media device. If an update is required to the multimedia content stored on an external media device currently in use, the update can be made by simply removing the external media device and inserting another external media device that stores the updated content (or modifying the media content on the external media device and returning the device to the source input). Processor 105 is configured to access and render whatever media content is stored on the external media device. Therefore, no user input is required when an external media device is switched. In this way, updates can be easily and quickly supplied.

Another benefit of supplying multimedia content in this manner is that it allows for centralized control over the multimedia content without excessively compromising the security of the display system. In many display environments that employ computer systems for controlling digital signs, the output that is provided to the digital sign is distributed and controlled from a remote location. Oftentimes, this remote location is a third party that manages the digital signs of many different entities. Some entities may not desire to provide such access to a third party.

The present invention addresses this issue by allowing multimedia content to be supplied from a remote location, but still allows the local entity to have ultimate control of what is displayed on its digital signs. For example, a remote provider can be tasked with providing updates to multimedia content (e.g. a menu). The updates can be supplied by sending external media devices (e.g. USB flash drives) to the local entity. Alternatively, the remote party can provide an interface (e.g. a website) from which the local entity can obtain updates to existing content such as by inserting the external media device into a computer system connected to the internet to receive an update. In either case, the multimedia content is ultimately retained and controlled locally.

Figure 2:
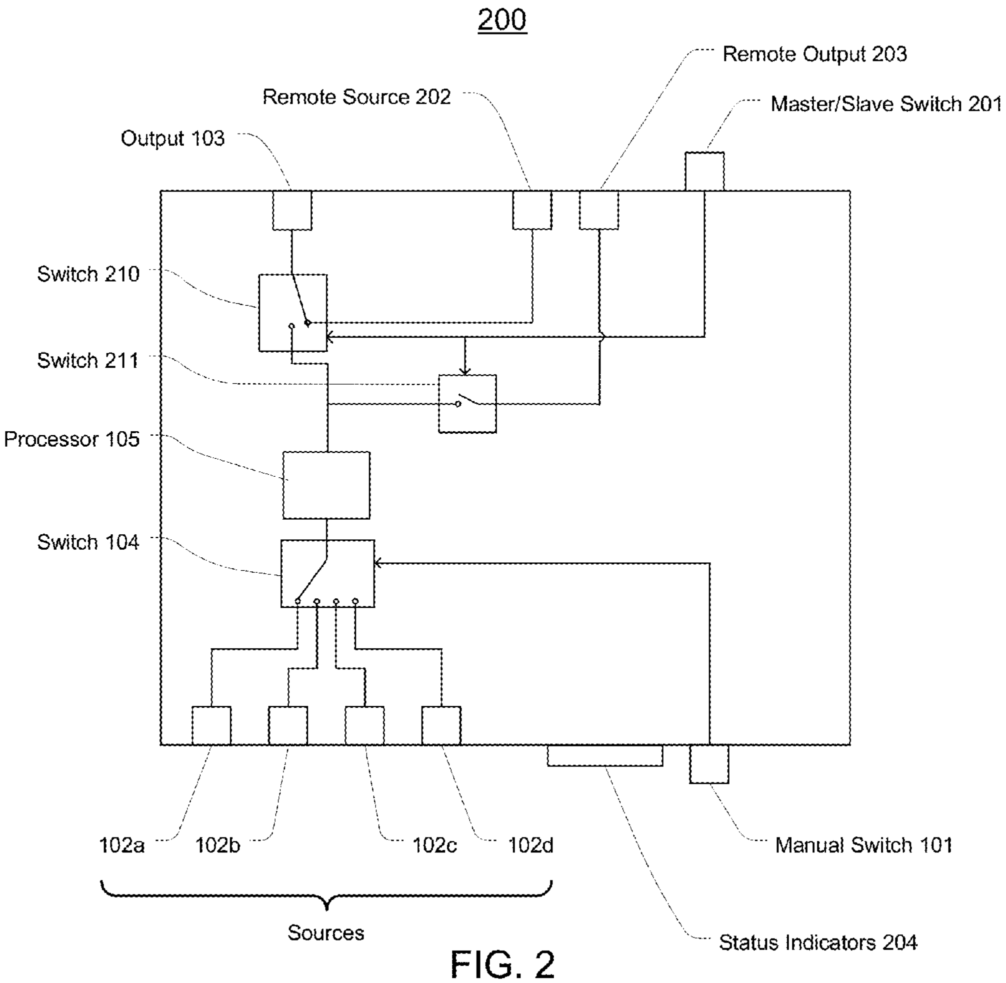
FIG. 2 illustrates a circuit diagram of another exemplary manual switch system.

FIG. 2 illustrates a circuit diagram of another exemplary manual switch system 200. Manual switch system 200 is similar to manual switch system 100 but includes components for enabling remote control by or of another manual switch system. Manual switch system 200 also includes status indicators 204 for displaying an indication of the current position of manual switch 101.

Manual switch system 200 includes a master/slave switch 201 for controlling whether multimedia content will be obtained locally or remotely. When master/slave switch 201 is set to the master position, manual switch system 200 functions similar to manual switch system 100 by accessing multimedia content from one of source inputs 102*a*-102*d*. In contrast, when master/slave switch 201 is set to the slave position, manual switch system 200 receives multimedia content from remote source 202.

As shown in FIG. 2, two additional switches 210, 211 can be used to implement the remote functionality in manual switch system 200. Although FIG. 2 illustrates switches 210 and 211 conceptually as separate components, it is to be understood that a single or multiple components could be used to implement the processing and switching functionality described herein.

Switch 210 controls whether a local or remote source is routed to output 103. Specifically, when switch 210 is in a first position (corresponding to the master state), multimedia content is routed from one of the local sources (input sources 102*a*-102*d*) depending on the state of manual switch 101. In contrast, when switch 210 is in a second position (corresponding to the slave state), as shown in FIG. 2, multimedia content being received via remote source 202 is routed to output 103.

Switch 211 controls whether multimedia content obtained from one of the local sources is output over remote output 203. When master/slave switch 201 is set to the master position, switch 211 can be closed to allow the multimedia content obtained from one of the inputs sources 102*a*-102*d* to be output over remote output 203 to another manual switch system 200 or another component (e.g. a monitoring component). In contrast, when master/slave switch 201 is set to the slave position, switch 210 can be opened so no content is output via remote output 203.

Accordingly, when in the master state, manual switch system 200 can be used to output the same multimedia content to both the locally attached display (via output 103) and a remote display device (via another manual switch system 200 set in the slave state).

Although FIG. 2 illustrates master/slave switch 201 directly controlling the state of switches 210 and 211, it is to be understood that master/slave switch 201 could be connected directly to processor 105 with processor 105 directly controlling the state of switches 210 and 211 based on the input from master/slave switch 201. In other words, the invention is not limited to the use of any particular internal components or arrangement of components for providing the described functionality. and in some embodiments, all of the above described switching and processing functionality can be provided by a single component.

Remote source 202 and remote output 203 can comprise any appropriate port for transmitting data over a connection. For example, in a common implementation, remote source 202 and remote output 203 can comprise Ethernet ports to allow multiple manual switch systems 200 to be interconnected using Ethernet cables. Of course, other types of ports could equally be used for either or both remote source 202 and remote output 203.

Manual switch 101 and master/slave switch 201 can comprise any manual switch that a user can physically operate. For example, these switches could be basic switches, tactile switches, DIP switches, rocker switches, pushbutton switches, etc. Generally, manual switch 101 can be mounted to a front panel of the manual switch system to enable easy access to adjust the switch.

Status indicators 204 can comprise any type of device or display for providing an indication of the state of manual switch system 200. For example, in some embodiments, status indicators 204 can comprise LEDs or an LCD screen.

Figure 3:
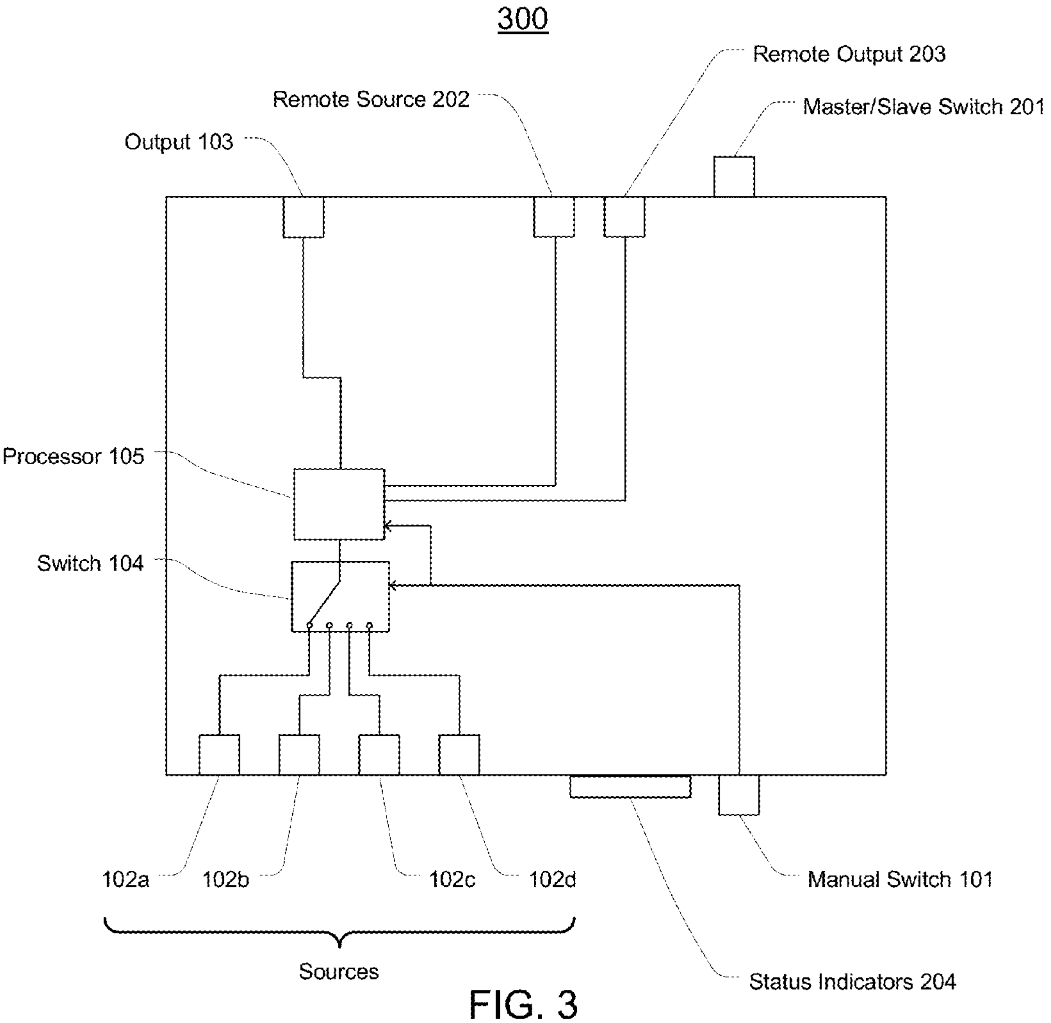
FIG. 3 illustrates a circuit diagram of another exemplary manual switch system 300.

FIG. 3 illustrates a circuit diagram of another exemplary manual switch system 300. Manual switch system 300 is similar to manual switch system 200 except that remote source 202 and remote output 203 are used for transferring control signals rather than multimedia content. Specifically, manual switch system 300 can be used to remotely control switch 104. For example, when master/slave switch 201 is in the master position, processor 105 can output a control signal via remote output 203 that specifies the state of manual switch 101. The control signal can cause another manual switch system 300 to set its switch 104 to the same position as switch 104 in the master manual switch system 300.

In this way, multiple manual switch systems 300 can be controlled from a single manual switch system. This can be useful in various environments such as when different manual switch systems are used to output a menu to an indoor menu display device and an outdoor (i.e. drive through) menu display device. For example, the indoor menu may have a different appearance than the outdoor menu, but both may need to be updated at the same time.

Figure 4:
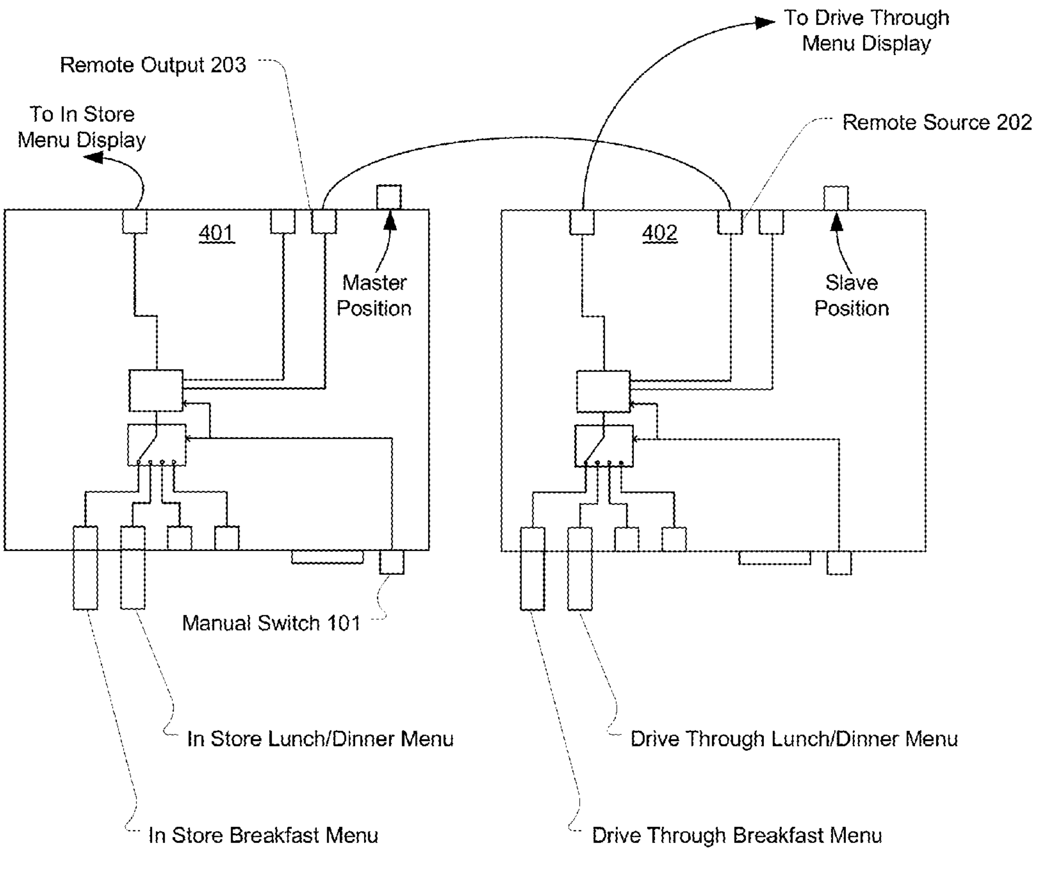
FIG. 4 illustrates a circuit diagram of interconnected manual switch systems.

FIG. 4 illustrates how two or more manual switch systems 300 can be chained together to allow each manual switch system to be controlled from a single master manual switch system. As shown, remote output 203 of a first manual switch system 401 is connected to remote source 202 of a second manual switch system 402. Manual switch system 401 is used to output menu content to an in store menu display device, whereas manual switch system 402 is used to output menu content to a drive through menu display device.

Each of manual switch systems 401 and 402 is also shown having two external media devices attached to source inputs 102*a* and 102*b* respectively. The external media device in source input 102*a* of each system stores the appropriate breakfast menu, and the external media device in source input 102*b* of each system stores the appropriate lunch/dinner menu.

As shown, manual switch system 401 is set as the master while manual switch system 402 is set as the slave. When set as the master, manual switch system 401 outputs a control signal over remote output 203 indicating what position switch 104 is in. This control signal is input, via remote source 202, to processor 105 of manual switch system 402. Because manual switch system 402 is set as a slave, processor 105 uses the control signal received via remote source 202 rather than the signal received from manual switch 101 to determine the position of switch 104. Accordingly, manual switch 101 of manual switch system 401 controls the position of switch 104 in both manual switch systems.

Using this configuration, an employee can switch from the breakfast to the lunch/dinner menu by simply pressing manual switch 101 on manual switch system 401 thus causing switch 104 in both systems to be set to access the lunch/dinner menu content stored on the external media device connected to the corresponding input source 102*b*.

In some embodiments, manual switch system 300 can be configured so that a control signal is also output over remote output 203 even when manual switch system 300 is configured as a slave. In this way, multiple additional manual switch systems 300 could be chained together (e.g. another manual switch system 403 could be connected to manual switch system 402 to receive the appropriate control signal from manual switch system 401).

FIG. 4 can also represent the chaining of manual switch systems 200. In particular, rather than chaining together systems to propagate a control signal (as described above), a data signal could be propagated from a master to each connected slave system. Such configurations could be beneficial when the content on a single external media device is to be displayed simultaneously on various remote displays.

In some embodiments, the control signal transferred from a master to a slave may identify whether the control signal specifies a position for switch 104 or whether the control signal comprises data to be output via output 103 for display. To provide this option, master/slave switch 201 could include additional positions or another switch could be provided (e.g. to allow the user to set whether a control signal only, or a control/data signal is to be output by the master/received by the slave). In some embodiments, when set as a slave, a manual switch system can be configured to automatically detect whether a control or a control/data signal is received. Such configurations provide the additional benefit of allowing a master to control the slave's selection of local content for display, or to provide the master's own local content for display.

This may be beneficial when a single external media device contains multimedia content that a user desires to display on the display devices connected to multiple manual switch systems. In such cases, the external media can be connected to an input source of the master and output over output 103 as well as over remote output 203 to another connected system (and any other chained systems). In this manner, an employee could quickly and easily display updated content (e.g. promotional content to be displayed temporarily) on many different devices without having to switch out external media devices on each manual switch system used to control the many different devices.

Figure 5:
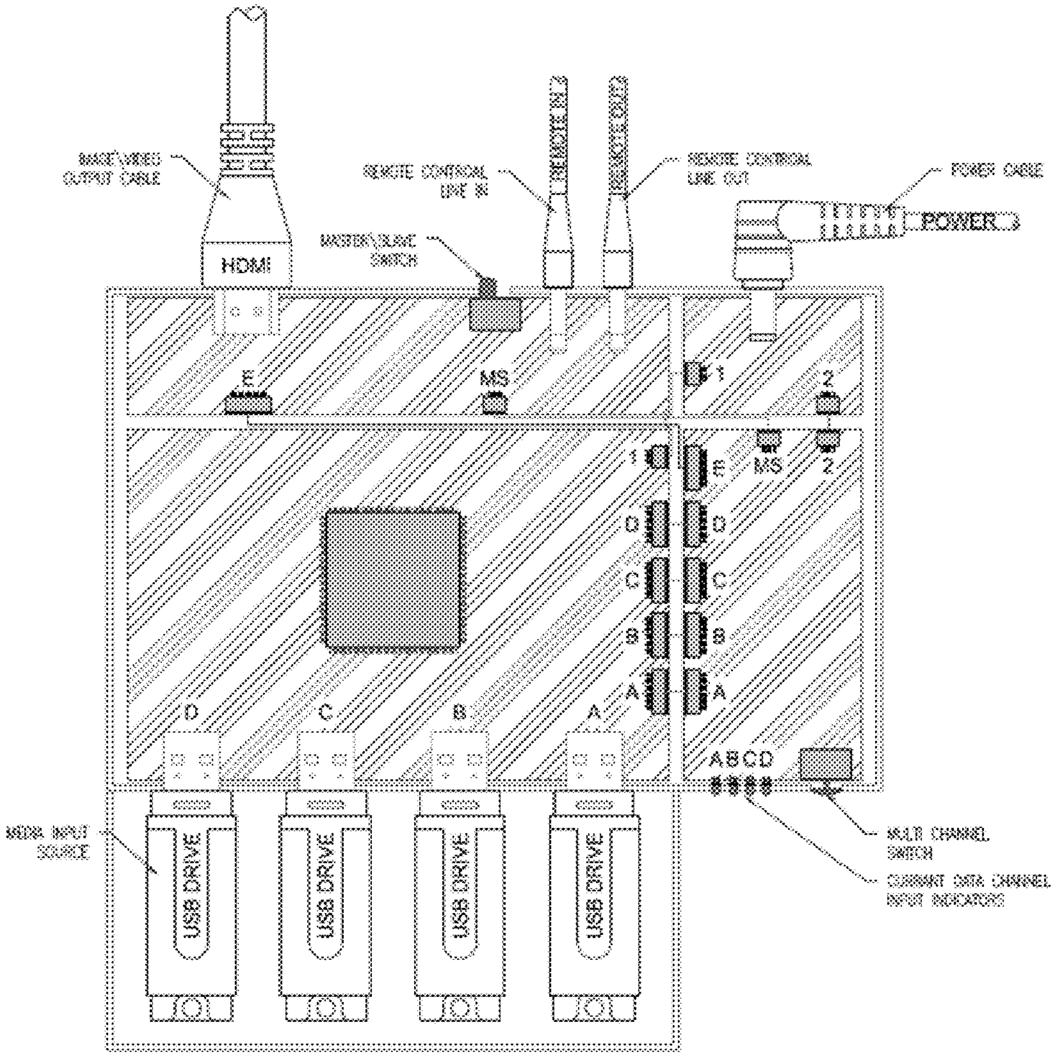
FIG. 5 illustrates a layout diagram of an exemplary implementation of a manual switch system.

FIG. 5 illustrates a layout diagram of an exemplary implementation of a manual switch system 500. Manual switch system 500 is configured with four USB ports as source inputs 102*a*-102*d* and an HDMI port as output 103. A single chip is used to implement the switching, processing, and rendering functionality for selecting and outputting the appropriate multimedia content.

Manual switch system 500 can be attached to any HDMI compatible display device or devices such as a standard flat panel television or computer monitor. Manual switch system 500 employs a push button for manual switch 101. Four LEDs are used to display the current source input of the system. To switch from displaying the contents of one USB drive to another, the user need only press the push button of manual switch 101 until the desired USB drive is selected as indicated by the LEDs.

Figure 6:
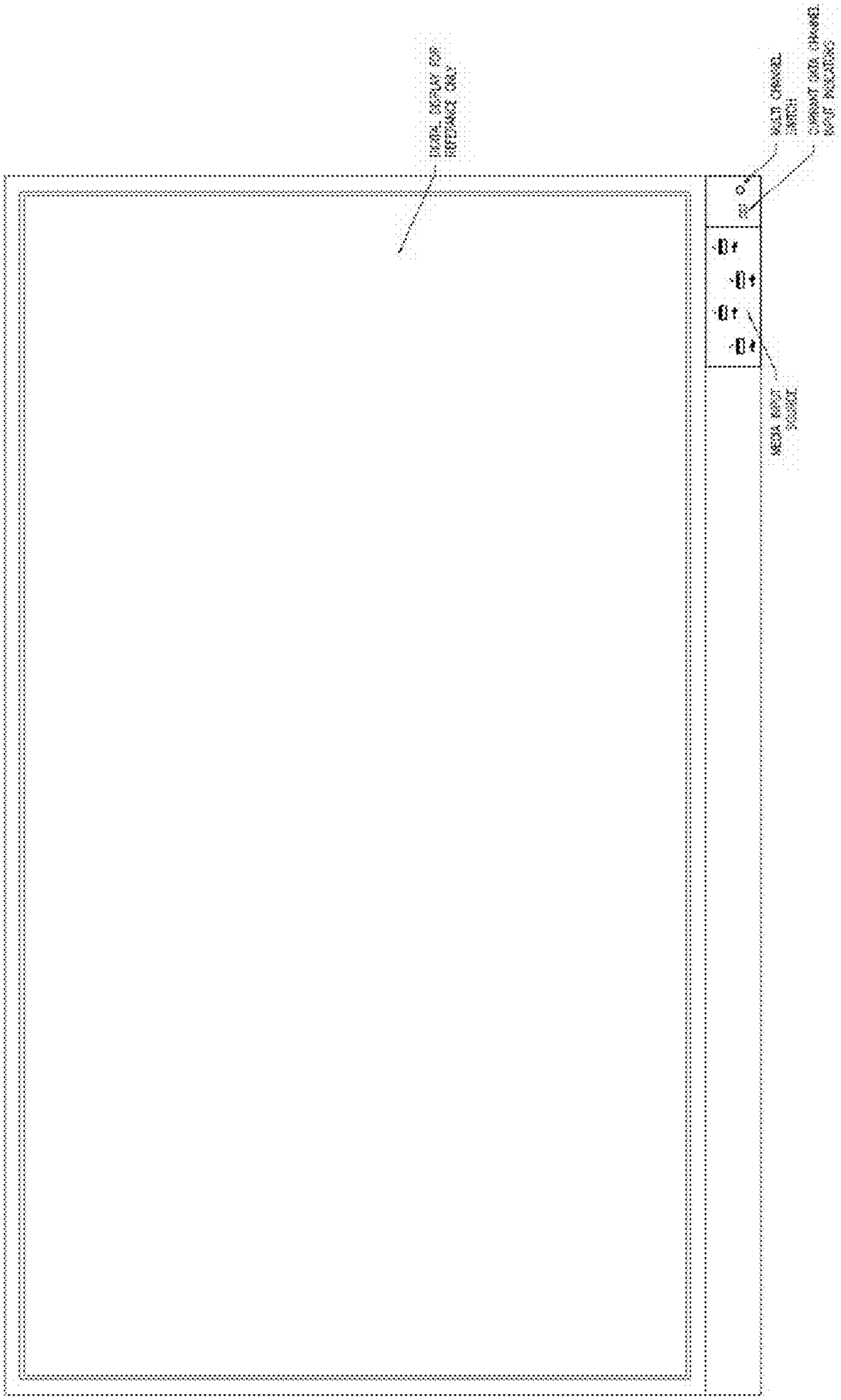
FIG. 6 illustrates a display device that incorporates an exemplary manual switch system.

FIG. 6 illustrates a display device into which the manual switch system of the present invention has been incorporated. Any of the above described manual switch systems could be incorporated into a display device such as a computer monitor or television.

As can be seen, the manual switch system of the present invention provides an inexpensive, simple, and secure solution for controlling a digital display. Anyone capable of inserting external media devices and pressing or flipping a switch can operate the manual switch system to quickly update the display of a digital sign.

Although this specification has used restaurants, and particularly fast food restaurants, as exemplary environments where the manual switch system can be used, it is to be understood that the manual switch system could be used in any environment where a digital display is located. The manual switch system of the present invention is particularly beneficial in environments where digital displays need to be quickly and frequently updated, but where it is desired to retain manual control over such updates.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed:

1. A manual switch system for controlling the output of multimedia content to a digital display device, the manual switch system comprising:

a plurality of source input ports for receiving external media devices, the external media devices storing multimedia content;

an output port configured to couple the manual switch system to one or more display devices;

a first switching mechanism for selectively connecting one of the source input ports to a processor;

a remote source port for receiving remotely rendered multimedia content from another manual switch system;

the processor for accessing and rendering the multimedia content on a selected one of the external media devices;

a second switching mechanism for routing either the multimedia content rendered by the processor or the remotely rendered multimedia content to the output port of the manual switch system;

a remote output port for outputting the multimedia content rendered by the processor to the other manual switch system;

a third switching mechanism for selectively routing the multimedia content rendered by the processor to the remote output port for output to the other manual switch system;

a master/slave switch for controlling the second and third switching mechanisms, wherein when the master/slave switch is in a master position, the second and third switching mechanisms route the multimedia content rendered by the processor to the output port of the manual switch system and to the remote output port respectively, and when the master/slave switch is in a slave position, the second switching mechanism routes the remotely rendered multimedia content to the output port of the manual switch system; and a manual switch for controlling the position of the first switching mechanism.

2. The manual switch system of claim 1, wherein at least one of the first, second, and third switching mechanisms is implemented by the processor.

3. The manual switch system of claim 1, wherein the manual switch comprises a push button mounted on an exterior of a housing of the manual switch system.

4. The manual switch system of claim 1, wherein the source input ports comprise USB ports or SD sockets.

5. The manual switch system of claim 1, wherein the output port comprises an HDMI port.

6. The manual switch system of claim 1, wherein, when the master/slave switch is in the slave position, the third switching mechanism prevents the multimedia content rendered by the processor from being routed to the remote output port.

7. The manual switch system of claim 1, further comprising:

one or more status indicators for displaying an indication of the state of the first switching mechanism to a user.

8. The manual switch system of claim 7, wherein the one or more status indicators comprise a plurality of LEDs.

9. The manual switch system of claim 1, wherein the manual switch system is contained within a display device.

10. A display system comprising:

a first and a second manual switch system, each of the first and second manual switch systems comprising:

a plurality of source input ports for receiving external media devices, the external media devices storing multimedia content;

a switching mechanism for connecting one of the source input ports to an output port;

a processor for accessing and rendering the multimedia content on the external media devices for display on a display device connected to the manual switch system via the output port;

a manual switch for controlling the position of the switching mechanism;

a master/slave switch for configuring the manual switch system as a master or a slave in a group of manual switch systems;

a remote output port over which is outputted a control signal for controlling the switching mechanism in another manual switch system when the master/slave switch is in a master position; and a remote source port over which is input a control signal from another manual switch system for controlling the switching mechanism of the manual switch system when the master/slave switch is in a slave position;

wherein, when the first manual switch system is configured as the master, and the second manual switch system is configured as a slave, the processor of the first manual switch system controls the state of the switching mechanism of the second manual switch system.

11. The display system of claim 10, wherein the control signal output by the first manual switch system causes the switching mechanism of the second manual switch system to be in the same position as the switching mechanism of the first manual switch system.

12. The display system of claim 10, wherein one or both of the first or second manual switch systems is incorporated into a display device.

13. The display system of claim 10, wherein the switching mechanism is implemented by the processor.

14. The display system of claim 10, further comprising:

a first display device connected to the output port of the first manual switch system, the first display device comprising a first digital sign in a restaurant; and a second display device connected to the output port of the second manual switch system, the second display device comprising a second digital sign at the restaurant that is located remote from the first digital sign.

15. The display system of claim 14, wherein the first digital sign is located inside the restaurant, and the second digital sign is located outside in a drive through of the restaurant.

16. A system for controlling the output of multimedia content to a plurality of digital display devices, the system comprising:

a first manual switch system and a second manual switch system that each comprises:

a plurality of source input ports for receiving external media devices, the external media devices storing multimedia content;

an output port configured to couple the manual switch system to a display device;

a first switching mechanism for selectively connecting one of the source input ports to a processor;

a remote source port for receiving remote multimedia content from the other manual switch system;

the processor for accessing and rendering the multimedia content on a selected one of the external media devices;

a second switching mechanism for routing either the multimedia content rendered by the processor or the remote multimedia content received from the other manual switch system to the output port of the manual switch system;

a remote output port for outputting the multimedia content rendered by the processor to the other manual switch system;

a third switching mechanism for selectively routing the multimedia content rendered by the processor to the remote output port for output to the other manual switch system;

a master/slave switch for controlling the second and third switching mechanisms, wherein when the master/slave switch is in a master position, the second and third switching mechanisms route the multimedia content rendered by the processor to the output port of the manual switch system and to the remote output port respectively, and when the master/slave switch is in a slave position, the second switching mechanism routes the remote multimedia content to the output port of the manual switch system; and a manual switch for controlling the position of the first switching mechanism.

* * * * *